Dec. 12, 1950   R. H. NILE ET AL   2,533,892
CHIPPING MACHINE
Filed May 13, 1949   4 Sheets-Sheet 1
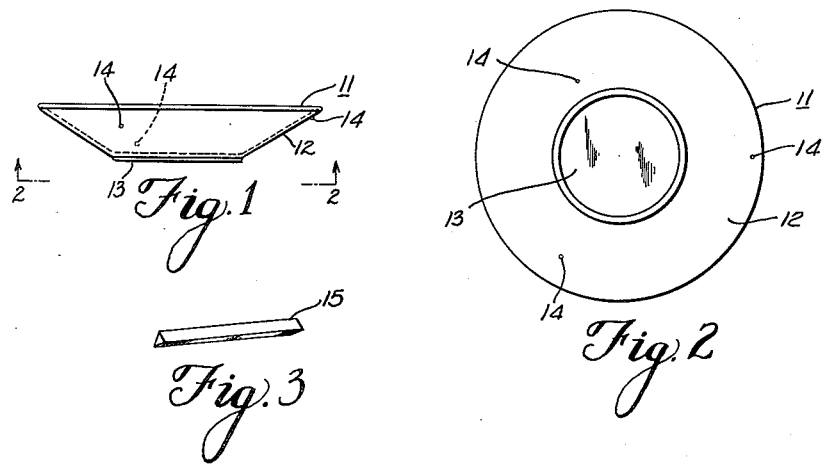
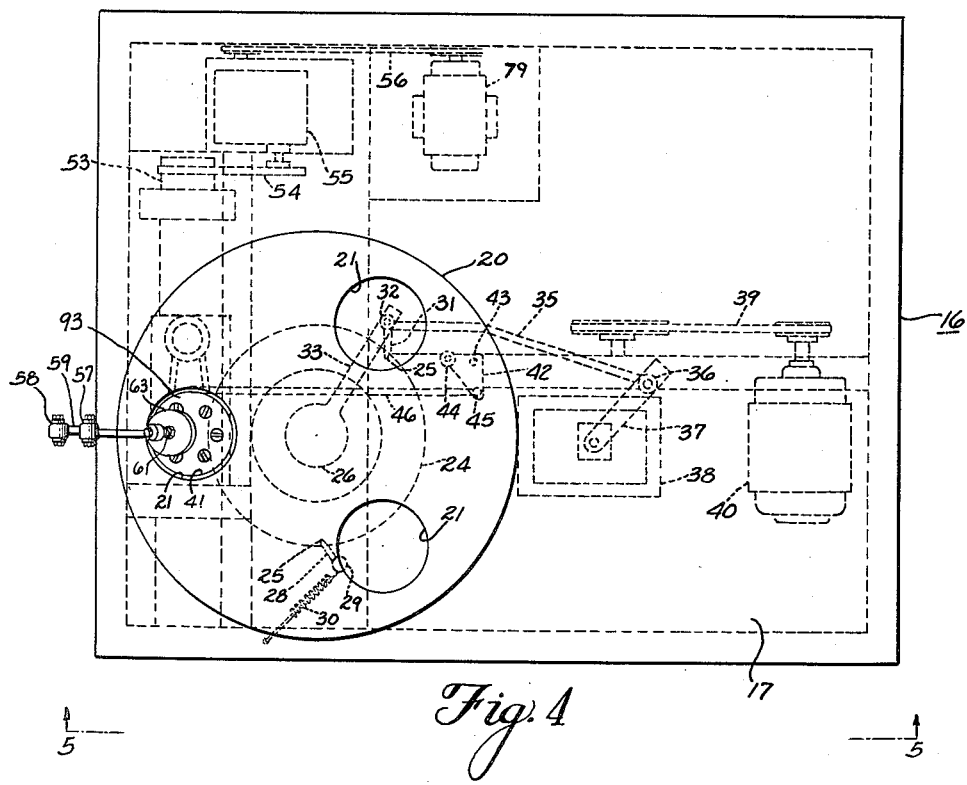
INVENTORS
ROBERT HUGH NILE
AND MICHAEL S. ROBERTS
BY Dec. 12, 1950  R. H. NILE ET AL  2,533,892
CHIPPING MACHINE Filed May 13, 1949  4 Sheets-Sheet 2

INVENTORS
ROBERT HUGH NILE
AND MICHAEL S. ROBERTS
BY
Attorneys

Dec. 12, 1950 R. H. NILE ET AL 2,533,892
CHIPPING MACHINE
Filed May 13, 1949 4 Sheets-Sheet 3

INVENTORS
ROBERT HUGH NILE
AND MICHAEL S. ROBERTS
BY
Woodling and Krost,
Attorneys

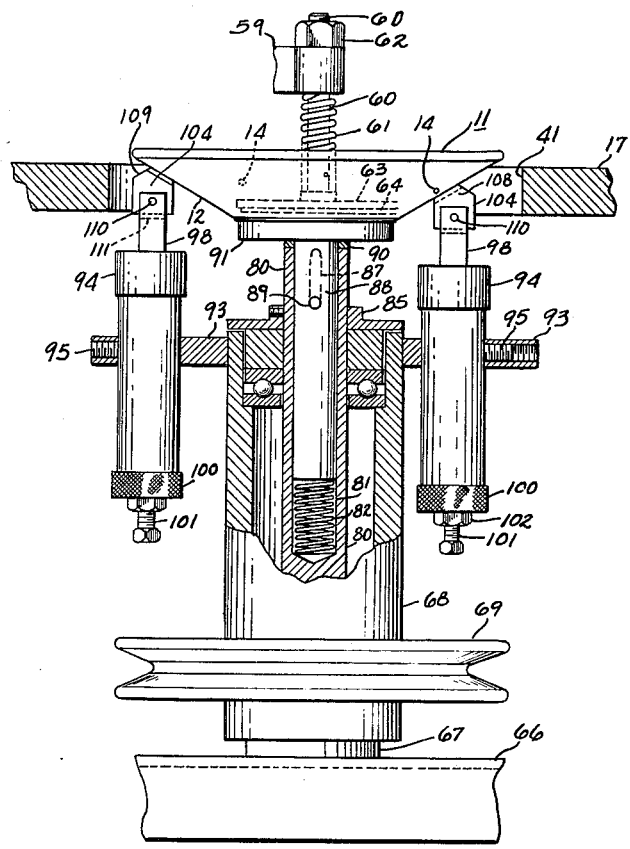
Fig. 9
Fig. 10
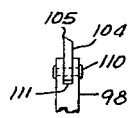
Fig. 11
Fig. 12

Patented Dec. 12, 1950

2,533,892

UNITED STATES PATENT OFFICE 2,533,892

CHIPPING MACHINE

Robert Hugh Nile and Michael S. Roberts, Wellsville, Ohio, assignors to The Sterling China Company Application May 13, 1949, Serial No. 93,105

15 Claims. (Cl. 125—9)

Our invention relates to machines for chipping or removing pin fragments or projecting irregularities from chinaware.

In the manufacture of chinaware, it is customary to first make the dish of desired form, in bisque, that is, an unglazed ceramic. After the bisque in hardened form is made, a glazing material is coated on the dish. The ceramic dish coated with a glazing material is then fired or heated to a high temperature in a kiln. The dishes covered with glazing material are placed in setters or large ceramic receptacles for holding the dishes in the kiln during the firing of the glazing material to liquefy the same. These setters or ceramic receptacles contain the dishes which are moved into and out of the kiln.

In the case of relatively flat chinaware, such as plates, saucers and the like, the dishes are supported in the setter one above the other in vertical rows by means of small ceramic pins. These ceramic pins are inserted in openings provided in the inner wall of the setter and project inwardly of the setter in a proper arrangement to support one dish above another so that the dishes do not rest upon, nor engage, each other. The extending pins are so arranged that three of them engage the underside of the flange or rim portion of the dish and thus provide a three-point support for each dish. Because the glazing material liquefies during the firing and thereafter hardens during the cooling period following the firing in the kiln, these ceramic pins become embedded in or adhere to the hardened glazing on the dish. Upon removal of the pins from the dish or the dish from the pins when the dish is removed from the setter, the pins fracture at a location near the surface of the dish but a relatively small portion of the ceramic pin remains embedded in or adheres to the hard glazing. This results in a pin fragment or small irregularity protruding outwardly from the otherwise smooth surface of the glazed dish.

Because the ceramic pins extending into the interior of the setter for supporting the dish and the dish setting upon the three pins are in a somewhat irregular arrangement and not completely symmetrical in respect to the dish, it is found that the projecting pin fragments usually are positioned at variable radial distances from the center of the dish and at varying heights up the inclined outer surface of the flange or rim of the dish. Therefore, the location of the protruding pin fragments on the glazed dish after removal from the setter is somewhat variable from dish to dish.

These protruding pin fragments are unsightly and furnish sharp and uncomfortable surfaces which may be touched by the hand of a person holding the dish. Therefore, it has been customary and a requirement in the trade to remove these projecting pin fragments extending from the surface of the dish. Heretofore, it has been the custom to remove the projecting pin fragments from the dish by hand operation. One way that this has been done is for a person to hold the dish in his hand and place the dish against a grinding wheel to grind off the projecting pin fragments. This is a slow and laborious method requiring much handling of the dish and is also open to the objection that the grinding wheel often grinds into the smooth glazed surface of the dish to provide a relatively large scar or unglazed portion around the location of the pin. Even though much care is taken a neat and efficient removal of the pin fragment is not readily obtainable by such method. Another method sometimes employed is for a person to hold the dish by hand and with a small chipping tool or chisel held by hand to chip or strike off the projecting pin fragments. This is quite inaccurate and did not always cleanly chip the pin fragment and often mars the smooth surface of the dish. It is a slow, inefficient method of obliterating the pin fragment and at best is unsatisfactory under actual industrial conditions.

It is an object of our invention to provide a machine which rapidly, efficiently and satisfactorily removes the projecting pin fragments from a dish.

Another object is the provision of a machine for removing the projecting pin fragments from a dish without marring or otherwise injuring the dish.

Another object is the provision of a machine for removing all of the projecting pin fragments extending from a dish simultaneously and in one operation.

Another object is the provision of a machine arranged to remove pin fragments extending from the surface of the dish at variable locations on the dish.

Another object is the provision of an improved machine for handling dishes during the removal of the pin fragments from the dish.

Other objects and a fuller understanding of our invention may be had by referring to the following description and claims, taken in conjunction with the accompanying drawings, in which:

Figure 1 is an elevational view of a typical dish in the form of a plate, saucer or the like, having a peripheral flange or rim.

Figure 2 is a bottom of the dish shown in Figure 1 and looking in the direction of the arrows 2—2 of Figure 1.

Figure 3 is a perspective view of one of the ceramic pins used in supporting a dish within a setter and shows the ceramic pin before use and before being broken away from a dish or fractured near an end thereof.

Figure 4 is a plan view of our machine showing the relative disposition of several parts thereof and showing the clamping device used for clamping the dish during the chipping operation situated in one of its variable positions.

Figure 8:
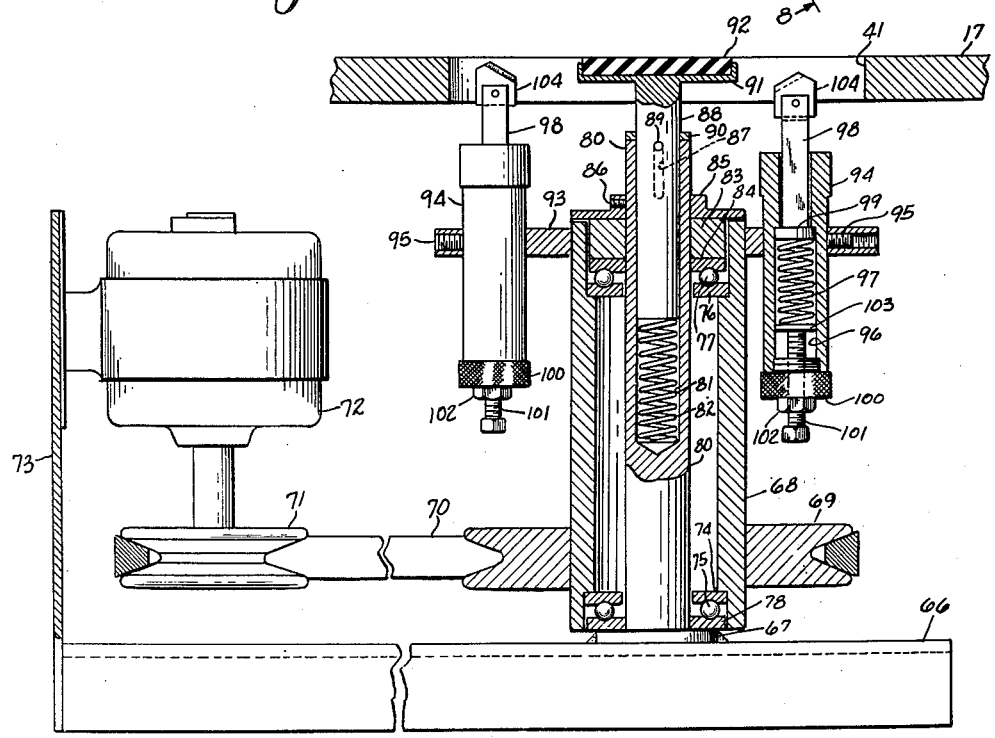
Figure 8 is a side view, with portions in section, of the chipping device in our machine and is a view looking in the direction of the arrows 8—8 of Figure 7.

Figure 9 is another side view of the chipping device in our machine, with portions shown in section, somewhat similar to that in Figure 8. In Figure 8, parts of the chipping device are shown in non-operating position prior to the clamping of a dish in operating position for the chipping operation. In Figure 9, the parts of the chipping device are shown in operating position with a dish clamped down in position for the chipping operation.

Figure 5:
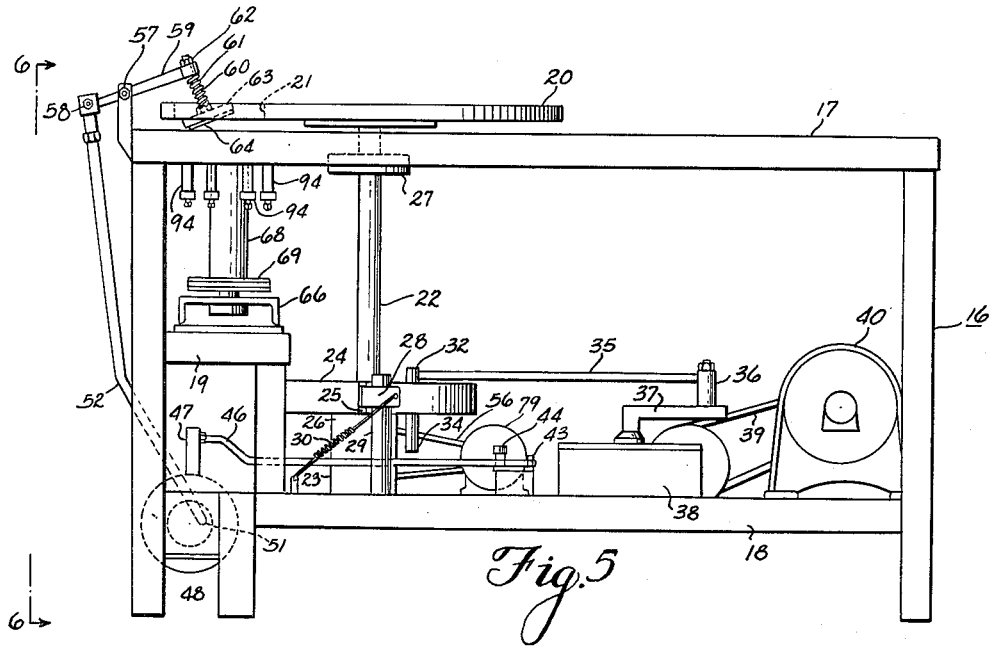
Figure 5 is a side elevational view of our machine looking in the direction of the arrows 5—5 of Figure 4.
Figure 6:
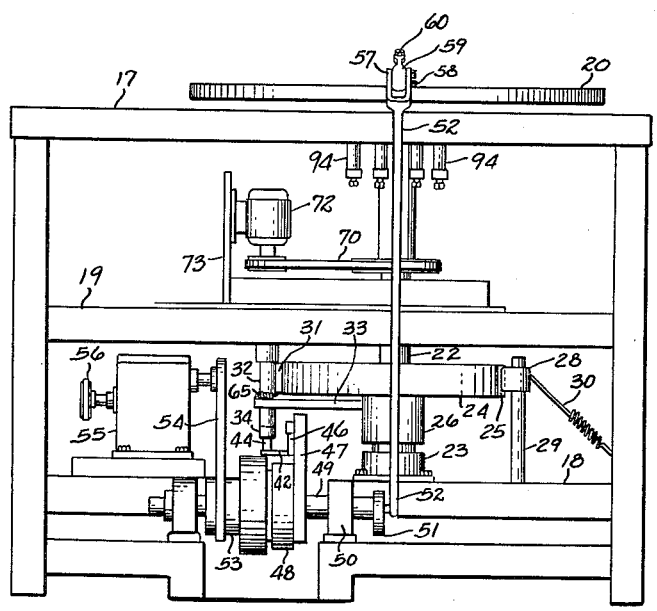
Figure 6 is an end view of our machine and looking in the direction of the arrows 6—6 of Figure 5.
Figure 7:
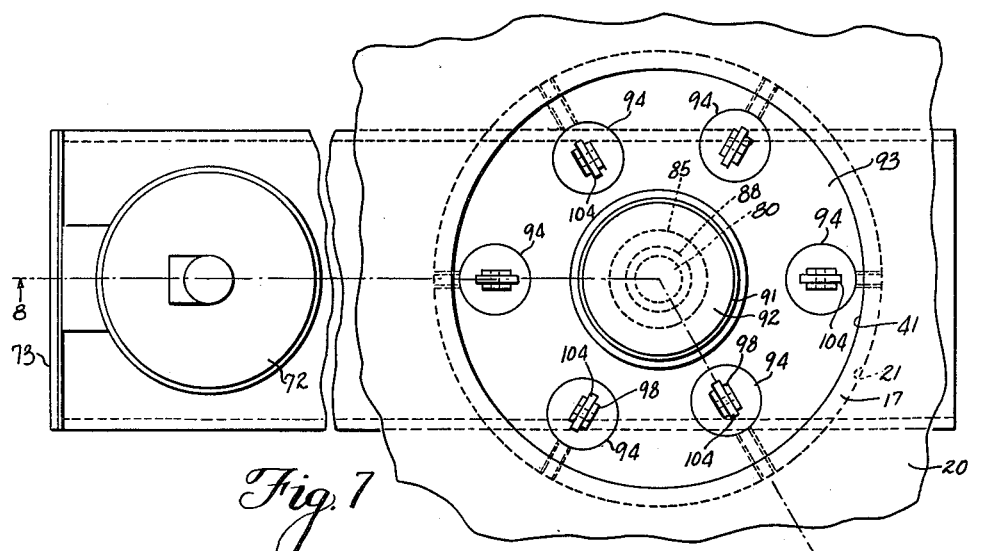
Figure 7 is a plan view of a portion of our machine showing the arrangement of the chipping device in the machine.

Figures 7, 8 and 9 are on a scale that is enlarged from the scale of Figures 4, 5 and 6.

Figure 10 is a side view of one of the chipping blades used in the chipping device.

Figure 11 is an end view of the chipping blade shown in Figure 10, and

Figure 12 is an end view of the same chipping blade shown mounted to the forked end of a supporting holder.

In the several views of the drawing, and particularly in Figures 1 and 2, the reference character 11 indicates generally a typical dish that is glazed and which has pin fragments extending therefrom. This relatively flat dish 11 is of a plate or saucer type having a flange or rim portion 12 extending outwardly and upwardly from the flat bottom 13. An annular pedestal portion surrounds the flat central portion at the junction of the flange 12 and flat bottom portion 13. Extending out from the glazed surface of the underside of flange 12 are three pin fragments or projecting irregularities 14. As seen in Figures 1 and 2, the pin fragments 14 are at variable radial distances from the center of the dish and at varying heights up the side of the flange. The pin fragments are small fractured segments of ceramic pins, like ceramic pin 15 shown in Figure 3. After the breaking away of a pin fragment 15 from a glazed dish after firing and hardening of the glaze, a small corner on one end of the pin 15 is embedded in and adheres to the hardened glazing, leaving the pin fragment 14. It is to the removal from the dishes of the pin fragments, such as pin fragment 14 shown by way of example in the drawing, that the present invention is directed.

With reference to the several views of the drawings, and particularly Figures 4, 5 and 6, the reference character 16 indicates generally the frame structure of our machine which supports and secures the several parts thereof. The frame 16 has a flat top or horizontal surface 17 which provides a working surface for the operator feeding or supplying dishes to the machine. There is a lower supporting portion 18 carried by the frame 16 and an intermediate supporting portion 19 carried by the frame upon which parts are carried and secured as herein shown and described.

Disposed horizontally of the top surface 17 and raised a small distance above it, is a round turntable or conveyor 20. This turntable 20 is in the form of a solid disc having three openings 21 therein and arranged at 120 degrees from each other, that is, equidistantly spaced in the turntable. The diameter of each round opening 21 is such that it somewhat exceeds the diameter of a dish 11 from which pin fragments are to be removed. The turntable 20 is interchangeable with similar turntables having other sized openings 21 to accommodate other size dishes. The size of openings 21 is such that a dish, such as dish 11, may pass through it, and at the same time the internal walls of openings 21 on a side thereof engage the edge of the dish and slide the dish along the top of horizontal wall 17 in a fairly true arcuate path and without excessive deviation therefrom. At one end of the frame 16 there is a round hole 41 extending through the top surface 17. This hole 41 may roughly approximate the size of openings 21 and its diameter somewhat exceeds the diameter of the dishes to be operated upon by the machine. The general relative sizes of the openings 21, round hole 41 and typical dishes worked upon by the machine are illustrated in the views of the drawings.

A shaft 22 non-rotatably secured to the turntable 20 extends down through an opening in the top wall 17 and is journaled through an upper bearing member 27 carried by the top wall 17. The shaft 22 rotates in the bearing member 27, and as the shaft 22 rotates it revolves the turntable 20. The bottom end of shaft 22 is supported by and journaled to a bearing support member 23 carried on lower portion 18 of the frame.

A large driving wheel 24 is splined or otherwise non-rotatably secured to the vertical shaft 22, so that as the driving wheel 24 is revolved, the shaft 22 is rotated, which in turn revolves the turntable 20. The outer circumferential wall of the driving wheel 24 has three notches or recesses 25 therein, and spaced equidistantly apart, so that the notches 25 are disposed at 120 degrees from each other in the drive wheel 24.

On one side of the drive wheel 24 there is positioned a cog or catch 28, which is biased by a spring 30 to bear against the outer circumferential wall of drive wheel 24 and to catch in a notch 25 when the drive wheel 24 revolves in one direction, and to pass over and not catch in the notches when the drive wheel 24 revolves in an opposite direction. The cog or catch member 28 is pivotally carried on a post 29 to hold it in proper operating position.

As viewed from the top of the machine, such as in the view of Figure 4, the turntable 20 is revolved in a clockwise direction, and to prevent its movement in a counterclockwise direction, the cog or catch 28 is arranged so that the cog permits the drive wheel 24 to move in a clockwise direction but to lock in against counterclockwise movement. At uniform intervals amounting to 120 degrees of the revolution of the drive wheel 24, the catch 28 engages in a notch 25 to prevent at that time the drive wheel from moving in such counterclockwise direction.

An arrangement is provided for moving the drive wheel 24 in steps or increments of 120 degrees. A collar or sleeve 26 is rotatably carried on the shaft 22 so that the collar 26 may freely revolve relative to the shaft 22 so that shaft 22 provides a pivot mounting for the collar 26. The collar 26 has an arm member 33 extending horizontally outward and radial of the collar 26. The outer end of arm member 33 has mounted thereon a vertical post member 32, and pivotally carried on this post member 32 is a cog or catch member 31. The cog or catch member 31 is arranged to catch in or engage a notch or recess 25 in the outer wall of drive wheel 24. Upon movement of the cog 31 on the post member 32 in a clockwise direction, the cog 31 engages in a notch 25 and revolves the drive wheel 24 in a clockwise direction. By moving the cog 31 through an 120-degree arc, the drive wheel is revolved by an increment of 120 degrees, and after completion of movement in that arc, the drive wheel 24 comes to rest for an interval of time. During this interval the cog 28 on the opposite side of the drive wheel 24 holds the drive wheel 24 against movement in a counterclockwise direction. A spring member 65 carried on the outer end of arm 33, shown in Figure 6, resiliently engages the cog 31 to turn it inwardly toward the drive wheel 24 and thus to resiliently bias the cog 31 into engagement with the outer surface of the drive wheel 24. The post member 32 extends vertically downward to terminate in the lower end portion 34. This lower end portion is for controlling a timing operation to be later described.

Pivotally carried on the post 32 and thus pivotally connected to the outer end of arm 33 is a horizontally disposed connecting rod 35, which extends away from the drive wheel 24. The driving end of connecting rod 35 is pivotally connected to a post 36 carried on the outer end of a revolving arm 37 which is driven to swing in a clockwise direction by a gear-drive device 38. Therefore, upon the swinging of the arm 37 by the gear-drive device 38, the post 36 revolves to reciprocate the connecting rod 35 and to thus recurrently move the cog 31 through an arc of 120 degrees.

An electric motor 40 mounted on the lower portion 18 of the frame drives the gear-drive device 38 through a suitable pulley, shaft and the belt 39.

A triangularly-shaped actuator member 42 is pivotally mounted to and carried by a pivot support 43 secured to the frame. On one opposite corner of the actuator member 42, there is a roller 44 pivotally secured thereto so that the roller 44 has its axis disposed vertically of the machine. At the other of the three corners of the actuator, a connecting rod 46 is pivotally secured thereto by the pivot connection 45. The actuator 42 is adapted to move in an arc of approximately 90 degrees on pivot 43 from one operating position to the other. Upon movement of connecting rod 35 to move the post 32 toward the gear-drive device 38, that is, toward the right in Figure 4, the lower end portion 34 of post 32 engages the roller 44 and presses against it to swing the roller 44 toward the gear-drive device 38 enough to shift the actuator 42 toward one of its positions. Upon such pivotal movement of the acutator 42, by lower end portion 34 striking and moving roller 44, the rod 46 is pulled by pivot connection 45 and thus the rod 46 is moved toward the gear-drive device 38, that is, toward the right in Figure 4. As the rod 46 is biased to move toward the left, the actuator 42 tends to resume its position shown in Figure 4 and holds that position until lower end of post portion 34 in its recurrent movement again strikes roller 44 to swing the actuator 42. In each sweeping action of arm 37 and rod 35, the actuator 42 will be operated once to move rod 46 to the right in Figure 4, and after disengagement of lower post portion 34 from roller 44, the actuator 42 immediately resumes the position shown in Figure 4 and the rod 46 is permitted to move back, that is, toward the left in Figure 4.

The clamping plate 63 is arranged to recurrently be raised and lowered relative to the round hole 41 in table top 17 and an opening 21 then registering with the hole 41. The clamping plate 63 is in the form of a disc having a downwardly projecting edge portion, and on the lower surface of the plate 63 there is positioned a rubber pad 64, which extends downwardly below the peripheral edges of the clamping plate 63. The rubber pad 64 is provided to give a gentle and resilient action in the engagement of the clamping device with the upper surface of the chinaware plate or saucer and also to provide for a non-slipping engagement between the clamping plate and the dish. As the surface of the dish is smooth, the rubber pad 64 engaging the plate prevents or limits any slippage or rotational movement of the chinaware plate relative to the clamping plate 63. The clamping plate 63 is secured to the lower end of a bolt or rod 60 whose upper end extends through an opening in one end of a rocker arm 59. There is a nut or head 62 secured to the upper end of bolt 60 above the rocker arm 59 to support the rod 60 and to prevent it from slipping downwardly through the opening in arm 59. A coil spring 61 is positioned around the bolt 60 and located intermediate the rocker arm 59 and the clamping plate 63, and the tension of the coil spring 61 is such that it resiliently urges the plate 63 downwardly away from the rock arm 59. The coil spring 61 thus further provides a resilient cushioning action for the clamping plate 63 and provides means for urging the clamping plate 63 downwardly relative to the outer end of the rocker arm 59.

The rocker arm 59 is pivotally carried by pivot support 57, which in turn is carried by the frame 16, the pivot support 57 being positioned intermediate the ends of rocker arm 59 so that pivot support 57 forms a fulcrum for the lever action of rocker arm 59. A relatively vertically disposed rod 52 has its upper end pivotally connected with the outwardly extending end of rocker arm 59 by means of a pivot connection 58. The pivot connection 58 is closer to the pivot connection 57 than is the bolt 60 carried by the other end of the arm 59. As the long rod 52 reciprocates upwardly and downwardly, this correspondingly rocks the arm 59 on pivot connection 57 and thus the clamping plate 63 is intermittently raised and lowered as the rod 52 is reciprocated in a vertical direction. The rod 52 is reciprocated by means of an eccentric drive device 51, which is mounted on the end of a shaft 49, which shaft 49 is journaled in a bearing 50 carried by the frame. In actual alignment with the shaft 49, there is a driving pulley 53 and intermediate shaft 49 and driving pulley 53, there is a clutch mechanism 48. By operating the clutch mechanism 48, the connection between driving pulley 53 and shaft 49 is engaged and disengaged. The clutch mechanism 48 is operated by a clutch lever 47, so that on the movement of clutch lever 47 in one direction, shaft 49 and pulley 53 are in driving engagement and upon movement of clutch lever 47 in an opposite direction, the driving pulley 53 and shaft 49 are disengaged out of driving connection.

The connecting rod 46 having its one end connected by the pivot connection 45 to the actuator 42, has its other end connected to the upper end of the clutch lever 47, so that upon reciprocation of connecting rod 46 the clutch lever 47 is moved from one of its operating positions to the other of its positions, and thus reciprocation of rod 46 by actuator 42 operates the clutch mechanism 48.

Driving pulley 53 is rotated by a belt 54, which in turn is driven by gear reduction device 55, which in turn is driven by a belt 56 in engagement with and driven by an electric motor 79. The electric motor 79 thus drives the pulley 53 and when the clutch mechanism 48 is in engaging position, drives the eccentric device 51 to reciprocate the rod 52, and thus to move the clamping plate 63.

Therefore, the revolving of the turntable or conveyor 20 is synchronized with the raising and lowering of clamping plate 63, because the clutch mechanism 48 is operated by the drive mechanism for rotating the turntable 20. The spring in the clutch mechanism 48 is such as to resiliently move the rod 46 in one direction to keep the actuator 42 in position shown in Figure 4 until the lower post portion 34 presses against and moves the roller 44. The dimensions, spacing and arrangement of the several parts and the interconnection between the clamping device 63 and the revolving turntable 20 is such that the proper synchronization is obtained to raise the clamping plate 63 free and clear of the top of the turntable 20 between movements of one opening 21 to position below the clamping plate 63 and the movement of the next successive opening 21 to that position. Upon registering of an opening 21 with round hole 41 in table top 17, the synchronization is such that the clamping plate 63 is moved downwardly and through the aligned opening and round hole.

The chipping device of our machine is mounted upon a support member 66 which is carried by the intermediate supporting portion 19 of frame 16. The general outline of the chipping device is shown in Figures 4, 5 and 6, below and in alignment with the round hole 41 in the top surface 17 of frame 16 and below the clamping device 63. In Figures 7, 8 and 9, which are on an enlarged scale, detailed construction of the chipping device is shown. The journal support 67, having a fixed post 80 extending upwardly and centrally thereof, is rigidly secured to and carried by the support member 66. A rotating body is carried by the support 67 and upright post 80 so as to revolve around the axis of the upright post 80. This rotating body is comprised of a hollow cylinder 68 and associated parts. Secured to the lower end of the revolving cylinder 68 and extending radially therein is a lower race member 74. Another ball bearing race 78 is secured to the support member 67, and between the races 74 and 78 are a plurality of ball bearings 75. Thus, at the lower end of the revolving cylinder 68, the bearing support provides for the revolving of the cylinder 68 relative to the upright post 80, which is in fixed position.

A pulley 69 is splined or other side rigidly secured to the revolving cylinder 68 in such manner that the revolving pulley 69 revolves the cylinder 68. A belt 70, in engagement with the pulley 69, is driven by a pulley 71, which in turn is driven by an electric motor 72. A support bracket 73 carried by the support member 66 supports the motor 72 in proper aligned position. Thus, the electric motor 72 revolves the cylinder 68 and all of the parts carried thereby.

Adjacent the upper end of the revolving cylinder 68, an upper race 76 is secured to the cylinder 68 and disposed radially inward thereof, the race member 76 revolving with the cylinder 68. A plurality of ball members 77 ride in the race member 76 and are disposed around the annular extent thereof.

Positioned over the upper end of the cylinder 68 is a securing cap or collar 85, which is non-rotatably secured and engaged to the upright post 80 by a set screw 86. Between the cap or collar member 85 and the race member 76 carried by the cylinder 68, there is a spacer collar 83, and below the collar 83 is a race member 84. The spacer collar 83 and race member 84 are relatively stationary and tend to remain in fixed position with the upright post 80. There is a clearance between the upper edge of cylinder 68 and securing cap or collar member 85, so that the cylinder 68 may freely revolve relative to securing cap or collar member 85, the spacer collar 83 and the race member 84. The plurality of ball bearings 77 between race members 76 and 84 provide a good bearing support between the race members.

There is an open space or bore 81 extending downwardly into the fixed post 80 from the top thereof. Within the open space or bore 81 there is positioned a plunger or reciprocal member 88, the plunger 88 slidably fitting within the open space or bore 81 so as to be reciprocal relative to the fixed post 80. Within the open space or bore 81 and below the plunger 88, there is positioned a coil spring 82 resiliently pressing upwardly on the bottom of the plunger 88 and tending to move the plunger 88 outwardly of the bore 81. Mounted upon the upper end of the plunger 88 there is a disc or a plate member 91, having upturned peripheral edges as shown. Mounted on the plate 91 is a rubber pad 92 situated between the upturned peripheral edges. The plate 91 provides a clamping plate for clamping chinaware dishes during the chipping operation. The rubber pad 92 acts as a resilient cushion for dishes pressed downwardly thereon and provides a non-slipping engagement with a flat bottom 13 of a dish, such as dish 11. The clamping plate 91 and rubber pad 92 are referred to as the lower clamping member, and the clamping plate 63 and rubber pad 64 carried by the rocker arm 59 are referred to as the upper clamping member. The arrangement is such that with the upper clamping member in lowered position, a dish to be subjected to the chipping operation is pressed down and firmly clamped between the two clamping members. The clamping members firmly and gently hold the chinaware dish without marring it and without permitting it to rotate during the chipping operation. The size of the clamping plates is such that they engage the intermediate part of the chinaware dish and tightly squeeze the flat bottom portion 13 of the chinaware dish while the parts are in clamping position for the chipping operation.

To provide for limitation of the reciprocal movement of the plunger 88 relative to the fixed post 80, there are provided longitudinal slots 87 on opposite sides of the fixed post 80 at the upper end thereof. To close the upper end of the slots 87, a collar 90 is secured to the upper end of the fixed post 80 to provide a stop for the pins 89 in its upward movement. Thus, the pins 89 in slots 87 provide means for limiting the reciprocal movement of plunger 88. The pins 89 extend radially outward from, and are secured to the reciprocal plunger 88. By means of the action of the coil spring 82 and the pin and slot arrangement, provision is made for a resilient and a limited movement of the lower clamping member. Upon downward pressure on the lower clamping member, the plunger 88 is moved downwardly to permit a dish clamped thereby to be carried to a position for the chipping operation. After release of this downward pressure, the coil spring 82 causes the lower clamping member to rise upwardly so that the top of the clamping member, that is, the upper surface of the rubber pad 92, is substantially on the same plane as the top of the flat top 17, extending over the frame 16. The downward pressure on the lower clamping member is provided by a dish being pressed downwardly thereon by the upper clamping member. Upon release of this downward pressure, the dish is resiliently carried upward away from the continuously revolving chipping device and to a plane where it may be laterally moved away from the chipping device by the turntable 20. The upward position of the plunger 88 to where the lower clamping member is in its raised position is illustrated in Figure 8. In this position there is no dish being pressed downwardly upon the rubber pad 92 of clamping plate 91.

A flat, horizontally-disposed disc or wheel 93 is secured to the upper end of revolving cylinder 68 so as to revolve therewith. This flat disc 93 has six holes extending therethrough, each of the holes being at a variable radial distance from the axis of the disc 93. Extending vertically through each of these holes is a cylindrical body 94, so that there are six cylindrical bodies 94 carried by the horizontal disc 93. The radial distance of each of these bodies 94 from the axis of the disc 93 is somewhat different in the case of each body 94. The bodies 94 are spaced apart from each other relative to said axis at about 60 degrees from each other. Because of the inclination or slope of the bottom surface of the flange portion 12 of dish 11 and because of the varied radial distances of each body 94 from the axis of the disc 93, and hence from the axis of a chinaware plate held in operating position, the elevation of respective bodies 94 is varied so as to accommodate the chipping device to the shape of the dish. For example, in Figures 8 and 9, the body 94 on the left side of each view is positioned at a higher elevation than the body 94 on the right side in said views. In the case of each of the six cylindrical bodies 94, the elevation thereof is determined according to the radial distance of the respective body 94 from the axis of the fixed post 80, that is, the axis of the whole chipping device. Those cylindrical bodies 94 radially inward of the disc 93 are positioned at a relatively lower elevation. As the radial spacing of each body 94 varies from the radial spacing of the others, so too the elevation of each body 94 varies from that of the others. To lock each cylindrical body 94 securely to the disc 93 and at the determined elevation, a set screw 95 embedded in a suitable radially directed threaded opening in the disc 93 is provided. As there are six bodies 94, there are six embedded set screws 95, each of which is used to secure a body 94 in proper position relative to the disc or wheel 93.

Each body 94 has an opening extending therethrough, the opening being designated by the reference character 96. This opening or bore 96 is relatively large in diameter at the lower end of the body 94 and is of smaller diameter at the upper end of the body 94. There is a shoulder or step portion between the small upper portion and the larger lower portion of the bore. A plunger member 98 slidably fitting in the smaller portion of bore 96 is adapted to reciprocate therein. Each plunger member 98 has an enlarged head 99 which is only slightly smaller than the diameter of the larger portion of the bore 96 and greater than the diameter of the smaller portion of the bore 96, whereby the head 99 is formed to abut, or be stopped by, the shoulder between the two portions of the bore. Thus, the plunger 98 might freely reciprocate in the smaller portion of the bore, but the head 99 prevents the plunger 98 from rising beyond the limit permitted by the abutment of the head 99 with the shoulder provided within the bore 96.

A coil spring 97 is positioned within the bore 96 of each body 94 and is arranged to resiliently urge the plunger 98 upwardly relative to the body 94. A threaded cap 100 threadably engages and is secured to the bottom of each body 94 to close the bottom end of the bore 96. The closure or cap 100 has a threaded opening extending therethrough which threadably receives a bolt 101. A small disc 103, slightly smaller in diameter than the bore 96, is positioned within the bore 96 and rests upon the upper end of the bolt 101. A locking nut 102 on the bolt 101 is provided to lock the bolt in desired threaded engagement with the cap member 100. The lower end of each coil spring 97 rests upon the small disc 103 whereas the upper end of the coil spring 97 presses upwardly against the head 99 of plunger 98. By turning the bolt 101, the elevation of disc 103 may be varied and thus the tension on spring 97 may be varied as required. After this adjustment is made, the bolt 101 is locked in the determined position by the locking nut 102. As there are six bodies 94, there are likewise six respective plungers 98, six respective coil springs 97 and six respective assemblies of discs 103, bolts 101, closing caps 100 and locking nuts 102.

Mounted upon the upper end of each of the six plungers 98 is a chipping blade 104, by means of a pivot pin 110, which extends across between forked ends of the plungers as illustrated in the drawing. The chipping blades 104 are made of steel or other suitable hard material, having a contour or shape shown in detail in Figures 10, 11 and 12. Each chipping blade 104 has a long, sharp cutting edge 105 and a short portion 106 sloping down from this relatively long sharp edge 105. The chipping blade 104 may be composed of material that is all extremely hard or, as is preferred, the material immediately adjacent and at the long, sharp edge 105 is a carbide steel or other extremely hard material suited for forming a hard, sharp chipping edge at the corner 105. Extending transversely through the chipping blade 104, is a hole 107 and the pivot pin 110 extending through the forked ends of plunger 98 at the upper end thereof provides a pivot support for the chipping blade 104, whereby the chipping blade 104 may pivotally rock on the pin 110. The opposite flat sides of chipping blade 104 are designated by the reference characters 108 and 109. The flat side 108 extends upwardly more than the flat side 109 and the connecting surface between them adjacent the sharp edge 105 is slanted as shown. Thus, on the side of the chipping blade coinciding with the flat side 108, the side of sharp edge 105 coinciding with flat side 108 is flat and vertical. On the other side of the chipping blade adjacent to the sharp edge 105 the side is sloping or inclined.

As shown, the upper end of each plunger 98 is forked to accommodate a chipping blade 104. The bottom or wall, designated by the reference character 111, of the forked or recessed end of plunger 98 is spaced from the bottom edge of the chipping blade 104. This spacing is provided so that the chipping blade 104 may freely pivotally rock between limits on the pin 110, the limit to the rocking motion permitted being provided by the bottom wall 111 of the recessed end or crotch in the end of plunger 98. Therefore, there is limited rocking movement permitted to each chipping blade 104 to better accommodate each blade to the contour and surface on the bottom of flange 12 of dish 11. Upon moving the dish 11 downwardly to contact the dish flange 12 with the chipping blade 104, the chipping blades will pivotally rock so as to position the long sharp cutting edge 105 in correspondence with the inclination of the flange 12 of dish 11.

The chipping blades 104 are so mounted to the plungers 98 that the flat or abrupt side 108 adjacent the cutting edge 105 of each blade first meets or encounters the pin fragments 14 extending out from the surface of the dish. Therefore, the disposition of the chipping blade relative to the plunger 98 depends upon the direction of rotation of cylinder 98 as driven by pulley 69. In the arrangement shown in Figures 7, 8 and 9, the cylinder 68 and hence the body 94 and chipping blades 104 are revolved in a clockwise direction as viewed in looking downwardly of the chipping device. Thus, on the right-hand side of the device shown in Figures 8 and 9, the flat abrupt side 108 appears, whereas the chipping device on the left-hand side of these views shows the short side 109. By this arrangement, a good, strong and positive chipping action is obtained in that the flat vertical side of the chipping blade adjacent the cutting edge meets the projecting pin fragments at the proper angle to cleanly chip or sever them from the dish. Should the chipping device revolve in an opposite direction, the sloping sides inclined down toward the short side 109 of each chipping blade would slide by a camming action over the pin fragments. The resiliency of the coil springs 97 in each body 94 would permit the chipping blades to thus slide over the projections without cleanly chipping them off if the chipping blades were not properly arranged in respect to the direction of revolution of the whole chipping device. It is found by the arrangement shown that a clean definite chipping action is obtained and the pin fragments are knocked off level with the outer surface of the dish adjacent the pin fragment. By reason of the resilient mounting of the chipping blades, the chipping blades readily slide over and glide upon the smooth, glazed surface of the dish until the edges thereof meet the projecting pin fragments and by reason of the angularity of the chipping blade at the chipping edge, the pin fragments are cleanly chipped off and the chipping blade continues in a gliding course around the under-surface of the flange portion of the dish.

The operation of the machine is substantially as follows: The several motors are started and this causes the turntable or circular conveyor 20 to revolve, the chipping blades 104 to revolve, and the upper clamping device 63 to intermittently raise and lower relative to the lower clamping plate through a clamping and unclamping operation. Dishes, such as dish 11, are placed in an opening 21 of turntable 20 before such opening 21 reaches the operating position above the chipping device. In Figure 4, this would be the opening 21 nearest the bottom of that view. The dishes may be successively fed to the turntable by an operator or by any other suitable feed, such as a belt conveyor. Upon revolving of the turntable 20 in a clockwise direction, the successive dishes are carried one at a time to position over the chipping device. When the dish upon which the chipping operation is to take place is positioned directly over the chipping device, the turntable stops by means of the synchronizing action of the drive heretofore described, wherein the turntable moves in increments of 120 degrees. When over this position, the bottom flat portion 13 of dish 11 rests upon the rubber pad 92 of the lower clamping device, and at that moment the dish is in the same horizontal plane as other dishes on the top of the horizontal surface 17. The intermittent action of the clutch mechanism 48 thereupon causes the upper clamping member, and particularly the clamping plate 63 and rubber pad 64, to descend downwardly to engage the upper surface of the plate intermediate the flange and to force the plate downwardly so that it assumes the position shown in Figure 9. In this position, the spring 82 has been compressed and the clamping members 63 and 91 firmly grip and clamp the plate therebetween, the rubber pad engaging the surface of the dish. The upper clamping member thus moving the plate downwardly to overcome the upward bias of the lower clamping member brings the dish downwardly so that the bottom surface of the flange 12 of the dish is in good engagement with the chipping edge 105 of the several chipping blades 104. As the chipping device is revolving during all this time, the chipping blades rapidly and efficiently chip away and remove the projecting pin fragments 14 on the dish 11. The cycle of operation is such that several revolutions of the chipping device take place while the dish is clamped down in firm engagement with the chipping blade. By reason of the variable spacing of the chipping blades, pin fragments projecting at variable radial distances from the center of the dish will all be encountered and chipped away by at least one of the chipping blades, and in most instances by more than one of the blades, depending upon the length of each chipping edge 105 relative to the sides of the dish. After a few revolutions of the chipping device while the plate is down, the arm 37 on the gear device 38 has moved to a position where the cog 31 engages the drive wheel 24 for movement of another movement to 120 degrees. At this stage of the operation, the clutch mechanism 48 is operated by the actuator 42 to move the upper clamping member, and upon its upward movement the spring 82 in fixed post 80 raises the lower clamping member to its elevated position shown in Figure 8. The turntable 20 then revolves and moves the dish from which the projecting pin fragments have been chipped away to the next operating cycle, whereby the finished dish is moved to a third position at 120 degrees from the position of chipping operation and there removed from the machine. The dish may be moved manually, or as we prefer, the top wall surface 17 is cut away at this third position immediately below the opening 21 holding the finished dish to permit the dish to fall or slide through the upper wall surface 17 to the lower part of the machine. A chute or slide is readily arrangable to permit the finished dishes to move by gravity from the turntable 20 after they have passed through the chipping operation. A successive dish to undergo the chipping operation, having been moved forwardly through an arc by the turntable, is next in position over the chipping device where the operation is repeated. Thus, for each complete revolution of the turntable 20, three dishes are subjected to the chipping operation. All of the moving parts of the machine are synchronized and no regulations or changes are necessary after the operation has once been started. The dishes with pin fragments are supplied at one place to the turntable and the finished dishes are removed at another location. By this means, a series of successive dishes are rapidly and efficiently treated to remove the pin fragments and without manual handling in the chipping operation. It is understood that another conveyor system other than the round turntable 20 may be used by appropriate rearrangement.

It has been found that this machine chips the pin fragments from the dishes not only more efficiently and rapidly than has heretofore been done, but also in a way that breakage of dishes is obviated and scarring or marring of the surface of the glazed dishes is eliminated. Other advantages and benefits of our machine are apparent from the consideration of the mechanism herein disclosed.

The present disclosure includes by reference herein the description set forth in the appended claims, as well as the foregoing detailed description of the machine shown and described in particularity as the best exemplification of the machine in its present form.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine for removing pin fragments or the like from chinaware dishes concave, comprising in combination a supporting structure, a revoluble body carried by the said structure, a plurality of reciprocal members carried by said body and aligned substantially parallel to the axis of said body, said reciprocal members being spaced at a plurality of radial distances from the axis of said body, resilient means for resiliently urging said reciprocal members in one direction, a chipping blade carried by each said reciprocal member, a first engaging member positioned in axial alignment with said body, said engaging member being adapted to engage within the concavity of and on one side of a said dish, a second engaging member adapted to engage the opposite side of said dish, operating means for moving one said engaging member toward and away from the other said engaging member for the clamping of a dish therebetween and the releasing of said dish, said first engaging member in clamping position being within the concavity of said dish and in releasing position being removed from the concavity of said dish to clear the same, conveyor means movable between said engaging members while in releasing position and transverse to the line of relative movement between said engaging members for moving consecutive dishes to a position between said engaging members and away from said position during separating of said engaging members and clearance of the dish by said first engaging member, driving means for revolving said body to revolve said reciprocal members and blades relative to the axis of said body, and means for synchronizing the operation of said operating means and said conveyor means to provide movement of the conveyor means during separation of the engaging members, the arrangement being such that upon a dish being moved by said conveyor means to between said engaging members and clamped therebetween, the said blades carried on said reciprocal members, urged in said one direction by said resilient means, and revolved by said body, slide around on, and in close engagement with, a side of said clamped dish and upon meeting said pin fragments chip the same from the dish.

2. A machine for chipping irregularities projecting from articles, comprising in combination clamping means for clamping a said article at an operating position, said clamping means being movable between clamping and unclamping positions in a first line of action, conveyor means for conveying consecutive articles to and from said clamping means, said conveyor means being movable in a second line of action traversing said first line of action, a revoluble chipping member adapted to chip an irregularity projecting from an article clamped at said position, means for moving said clamping means in said first line of action toward and away from said chipping member to move said article to and away from said operating position, and means for synchronizing the movements of said conveyor means and said clamping means to provide for serial movement of consecutive articles by said conveyor means in said second line of action and by said clamping means in said first line of action to and from said operating position for chipping of irregularities from said articles by said chipping member.

3. Apparatus for removing from glazed ceramic dishes the ceramic pin fragments or the like adhering thereto, comprising in combination a supporting frame, a revoluble chipping device carried by said frame for chipping said fragments from a said dish held at an operating position, said chipping device including a plurality of chipping blades, individual mounting means for each of said blades, resilient means carried by each said mounting means for urging said blades toward said operating position, and driving means for revolving said mounting means, resilient means and blades about a common axis, said blades being positioned at a plurality of radial distances from said axis to encounter pin fragments at varied radial distances from the center of a said dish and being flexibly connected to said mounting means, respectively, to permit ready accommodation of said blades to the contour of a said dish, holding means movable in a second line of action traversing at right angles the first line of action for holding a said dish at said operating position, said holding means being movable in a first line of action substantially coinciding with said common axis to carry a said dish to said operating position from a position spaced from said operation position, and conveyor means for successively moving dishes to and from said position spaced from said operating position, the arrangement of said chipping device, holding means and conveyor means being such that dishes are consecutively conveyed to said operating position, held at said operating position by said holding means, and the said fragments adhering thereto are chipped from the dish by the blades of the chipping device revolving relative to said dish.

4. In apparatus for the removal of pin fragments protruding from the peripheral portion of the bottom side of glazed chinaware dishes, a chipping device adapted to chip said fragments from said dishes comprising in combination, a supporting base, a pedestal member carried by the base, a plunger member carried by, and reciprocal between limits relative to, said pedestal member, an engaging member carried by said plunger member and adapted to engage the bottom side of a said dish intermediate of said peripheral portion of the dish, first resilient means carried by said pedestal member for resiliently urging said plunger member to extend relative to said pedestal member and to bias said engaging member toward the bottom side of said dish, said first resilient means being opposable by a dish pressed against said engaging member to provide limited resilient movement of said engaging member relative to said pedestal member, a revoluble member carried by said supporting base and adapted to revolve around the axis of said pedestal member, a plurality of chipping-blade holders carried by said revoluble member and arranged to position a plurality of chipping blades, respectively, at a plurality of radial distances from the axis of said pedestal member and to direct said chipping blades toward the peripheral portion of the bottom side of said dish, and second resilient means carried by each said chipping-blade holder for resiliently urging the chipping blade carried thereby to extend relative to said revoluble member and to bias said chipping blade toward the bottom side of said dish, the revolution of chipping blades carried by said holders and biased toward said dish chipping said pin fragments from said dish resiliently engaged by said engaging member.

5. A chipping blade for incorporation in a machine adapted to chip pin fragments from a dish, said machine having a chipping-blade holder for mounting said chipping blade, said holder having a pivot member adapted to engage said chipping blade and a guide portion for accommodating said chipping blade and maintaining the same in a plane disposed substantially radially of said dish, said chipping blade comprising a body of metal having opposite parallel walls adapted to engage said guide portion and to move within said guide portion in said plane, said body having an open space for accommodating said pivot member, said open space having an arcuate wall adapted to form a bearing for said pivot member, said opposite walls of the body on an end of said body converging to form an edge portion, the wall on one side of, an adjacent, said edge portion being disposed in a flat plane and adapted to be disposed substantially radially of said dish, the opposite wall of said body adjacent said edge portion converging in a slope toward said edge portion in said flat plane, the arrangement of said opposite walls, arcuate wall and edge portion being such that said body may pivotally rock on said pivot member while guided in said flat plane to conform the position of said body in said plane to the contour of said dish and upon relative revolutionary movement between said chipping blade and said dish in one direction, the flat wall on one said one side at said edge portion may abruptly meet a pin fragment on said dish, and in an opposite direction the sloping wall on said opposite side at said edge portion may slidably cam over a pin fragment on said dish.

6. A chipping blade for incorporation in a machine adapted to chip pin fragments from a dish, said chipping blade comprising a metal body having at one of its ends a hard chipping-edge portion adapted to engage and chip a said pin fragment, a guiding-surface portion adapted to slidably engage said machine for maintaining the chipping blade in a predetermined plane, an arcuate bearing portion adapted to pivotably engage said machine for permitting pivotal movement of said chipping blade relative to said machine and in said plane, and a movement-limiting portion at an opposite end of said body and adapted to engage said machine at two limiting positions for limiting said pivotal movement of said chipping blade in said plane.

7. A machine for chipping pin fragments from ceramic dishes, comprising in combination chipping means adapted to engage a said dish at an operating position and adapted to chip a said fragment from said dish at said operating position upon movement of said chipping means, support means for said chipping means, revolving means for revolving said support means and chipping means about an axis, biasing means for urging said chipping means in one direction, movable clamping means for clamping a said dish in said operating position, said movable clamping means including a reciprocable plunger member adapted to fit within, and engage the upper surface of, a said dish and a reciprocable engaging member resiliently biased toward said plunger member and adapted to engage the bottom outer surface of a said dish, operating means for moving said movable clamping means longitudinally of said axis and in an opposite direction to move a dish clamped thereby toward said chipping means in opposition to said biasing means, and feed means for successively feeding consecutive dishes to said clamping means, said feed means being movable in a path traversing the path of said clamping means moving a said dish toward said chipping means and being synchronized to feed a dish to said clamping means between movements of the clamping means toward said chipping means.

8. A device for removing pin fragments extending from the bottom surface of glazed ceramic dishes at varied radial distances from the center of said dishes, comprising in combination a rotor member, support means for said rotor member, a first engaging member disposed axially of said rotor member and reciprocably movable axially of said rotor member, said first engaging member being adapted to engage a said dish on a side thereof, first resilient means biasing said first engaging member in a first direction, a second engaging member movable toward and away from said first engaging member, said second engaging member being adapted to engage a said dish on an opposite side thereof, means for recurrently moving said second engaging member toward said first engaging member to clamp a said dish therebetween and to move said clamped dish in a second direction in opposition to said first resilient means to an operating position, a plurality of chipping members carried by said rotor member and adapted to revolve relative to said clamping members, said chipping members having chipping-edge portions arranged at variable radial distances from the axis of said rotor to engage pin fragments at varied radial distances from the center of a said dish, said chipping-edge portions being disposed to engage and chip off said pin fragments upon the holding of a said dish at said operating position by said clamping members and upon the revolution of said rotor member carrying said chipping members.

9. A machine for chipping pin fragments from glazed chinaware dishes, comprising in combination a plurality of chipping members revoluble around an axis, said chipping members being biased upwardly and being positioned at variable radial distances from said axis, a pair of clamping members adapted to clamp a said dish therebetween, said clamping members together being movable to carry a said dish clamped therebetween downwardly and longitudinally of said axis from an upper plane to a lower plane to cause said dish to engage said chipping members in opposition to the upward bias of said chipping members, and conveyor means for moving consecutive dishes to said upper plane between downward movements of said clamping members and aligning the center of each said dish with said axis, the arrangement of said chipping members, clamping members, and conveying means providing for the consecutive movement of successive dishes to said chipping members and the chipping from the dish of pin fragments extending at variable distances from the center of the dish upon revolution of the chipping members relative to said dish.

10. In a machine for removing ceramic pin fragments protruding from the under-surface of the inclined flange of plate-like chinaware dishes, said pin fragments protruding at variable radial distances from the center of said dishes and at variable elevational distances up the said inclined flanges, a chipping device comprising a revoluble rotor, a plurality of chipping-blade holders carried by said rotor, a plurality of chipping blades, each carried on an upper end portion of a said holder, said holders being mounted on said rotor to position said chipping blades at variable radial distances from the axis of said rotor and at variable elevations, pivot mounting means for pivotally mounting each said chipping blade to the upper end portion of a respective said holder, said pivot mounting means being positioned to provide a fulcrum intermediate the opposite sides of a respective chipping blade to permit pivotal rocking of a said chipping blade in either direction on said fulcrum and in a plane extending radially from said axis and the accommodation of said chipping blade to the counter of a said dish, and resilient means carried by each said holder to bias the chipping blade upwardly toward and in contact with a dish positioned over said chipping blades, the arrangement of rotor, holders, chipping blades, pivot mounting means, and resilient mounting means providing for firm engagement of a dish pressed downwardly on said chipping blades in opposition to the bias of said resilient means, the accommodation of said chipping blades to the contour of said dish, and the chipping of said pin fragments protruding from said dish at said variable radial distances and at said variable elevations upon revolution of said rotor relative to said dish.

11. In a machine for removing pin fragments protruding from the under-surface of the inclined flange of plate-like chinaware dishes, said pin fragments being protrudable at various irregular locations on said under-surface, a chipping device comprising in combination a revoluble rotor, a plurality of chipping blades for chipping said pin fragments, each chipping blade having a bevelled longitudinal edge portion disposed to contact a said dish, a plurality of chipping-blade holders carried by said rotor to position the respective chipping blades at varied radial distances from the axis of the rotor and at varied elevations, said holders being movable between limits up and down relative to said rotor, resilient means carried by said rotor for biasing said holders upwardly to their upward limit and toward a said dish, and mounting means on each said holder for mounting a chipping blade thereto, each said mounting means including pivot means, guide means and two spaced stop means for providing pivotal rocking of each said chipping blade on a fulcrum disposed within said chipping blade between the ends of said edge portion and in a plane defined by said guide means radial of said axis and between limits defined by said spaced stop means, the arrangement of said rotor, chipping blades, holders, resilient means and mounting means providing upon revolution of said rotor for the chipping of pin fragments at said locations from a dish held down against said chpiping blades, and the conformity of said chipping blades to the contour of said dish, by the cooperation of said rotor, chipping blades, holders, resilient means and mounting means.

12. In a machine for removing a projection extending from the smooth under-surface of a plate-like chinaware dish, a chipping device comprising in combination a supporting member, a revoluble member revoluble about said supporting member, a dish-engaging member in axial alignment with said supporting member, a resilient means carried by the supporting member for biasing said dish-engaging member upwardly, a holder carried by said revoluble member, a chipping blade carried by said holder, and second resilient means carried by said holder for biasing said chipping blade upwardly toward a dish engaged by said dish-engaging member, the pressing of a dish downwardly against said dish-engaging member and against said chipping blade opposing said first and second resilient means, said dish-engaging member supporting said dish in firm engagement with said chipping blade and revolution of said revoluble member causing said chipping blade to strike and chip projections in the circular path of the chipping blade.

13. In a machine having an axis for chipping ceramic projections from a plate-like chinaware flanged dish centered on said axis, the combination of chipping means positioned at a radial distance from said axis and adapted to engage and chip off said projections, opposed clamping means adapted to engage opposite sides of a dish at a distance from, and radially inwardly spaced from, said chipping means, means for moving said clamping means in an axial direction toward said chipping means to carry a dish clamped thereby against said chipping means, means for permitting said chipping means to tilt in opposite directions relative to said dish to automatically accommodate itself to the contour of said dish by the engagement of said clamped dish against said chipping means, and means for providing relative revolving movement about said axis between said clamping means and said chipping means to chip off projections on said clamped dish.

14. The combination of chipping means adapted to chip pin fragments from a dish, clamping means for clamping a dish in position for chipping operation, said clamping means including opposed engaging members disposed to engage opposite sides of a said dish intermediate its peripheral edges, driving means for revolving one of said clamping means and said chipping means to provide relative movement between said chipping means and a clamped dish around a common axis, reciprocating means for moving an engaging member of said clamping means longitudinally of said axis toward the other said engaging member to carry a dish clamped therebetween toward said chipping means and to hold said clamped dish in firm engagement therewith, and resilient means for cushioning the movement of said clamping means and clamped dish toward said chipping means and for thereafter moving the said dish away from said chipping means.

15. The combination of chipping means adapted to chip pin fragments from a dish, clamping means for clamping opposite sides of a dish intermediate its periphery and in position for chipping operation, driving means for revolving one of said clamping means and said chipping means to provide relative movement between said chipping means and a clamped dish around a common axis, reciprocating means for moving said clamping means longitudinally of said axis to a clamping position relative to a said dish and to carry a clamped dish toward said chipping means and to hold said clamped dish in firm engagement therewith, resilient means for cushioning the movement of said clamping means and clamped dish toward said chipping means and for thereafter moving the said dish away from said chipping means, and mounting means for mounting said chipping means to cause said chipping means to shift position in conformity with the shape of said clamped dish with said chipping means, said mounting means including resilient means for urging said chipping means parallel to said axis toward said dish clamped by said clamping means.

ROBERT HUGH NILE.
MICHAEL S. ROBERTS.

REFERENCES CITED

The following references are of record in the file of this patent:

UNITED STATES PATENTS

| Number | Name | Date |
| --- | --- | --- |
| 1,888,710 | Arter et al. | Nov. 22, 1932 |
| 1,989,517 | Holmes | Jan. 29, 1935 |
| 2,152,193 | Johanning | Mar. 28, 1939 |
| 2,194,780 | Andersen | Mar. 26, 1940 |
| 2,270,590 | Johnson | Jan. 20, 1942 |
| 2,272,055 | Carlson | Feb. 3, 1942 |
| 2,387,927 | Miller | Oct. 30, 1945 |
| 2,468,404 | Miller | Apr. 26, 1949 |

FOREIGN PATENTS

| Number | Country | Date |
| --- | --- | --- |
| 71,616 | Germany | Nov. 1, 1915 |

Certificate of Correction

Patent No. 2,533,892 December 12, 1950

ROBERT HUGH NILE ET AL.

It is hereby certified that error appears in the printed specification of the above numbered patent requiring correction as follows:

Column 15, lines 9, 10 and 11, strike out the words "movable in a second line of action traversing at right angles the first line of action" and insert the same after "means" in line 17; column 18, line 49, for "chpiping" read *chipping*; line 60, after the word and comma "member," strike out *a*; and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*